United States Patent
Ito

(10) Patent No.: US 6,683,927 B1
(45) Date of Patent: Jan. 27, 2004

(54) DIGITAL DATA REPRODUCING APPARATUS AND METHOD, DIGITAL DATA TRANSMITTING APPARATUS AND METHOD, AND STORAGE MEDIA THEREFOR

(75) Inventor: Masahiro Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 624 days.

(21) Appl. No.: 09/695,204

(22) Filed: Oct. 24, 2000

(30) Foreign Application Priority Data

Oct. 29, 1999 (JP) .......................................... 11-310344

(51) Int. Cl.[7] ............................................... H04L 7/00
(52) U.S. Cl. .................... 375/355; 375/354; 375/295; 375/260; 381/312; 381/314; 381/317
(58) Field of Search ................. 375/377, 354, 375/295, 260; 381/312, 314, 317

(56) References Cited

U.S. PATENT DOCUMENTS 5,245,667 A * 9/1993 Lew .......................... 381/94.4
5,490,174 A * 2/1996 Shin et al. .................. 375/316
5,504,751 A * 4/1996 Ledzius et al. ............. 341/144

* cited by examiner

Primary Examiner—Don N. Vo
Assistant Examiner—Qutub Ghulamali
(74) Attorney, Agent, or Firm—Pillsbury Winthrop LLP

(57) ABSTRACT

A digital data reproducing apparatus and method are provided, which are capable of reproducing both digital audio data from the main body of the apparatus and digital data from an external interface, using a simple construction. A main body of the apparatus processes first digital data, an interface receives, from an external device independent of the main body, second digital data having a sampling rate asynchronous with and different from a sampling rate of the first digital data, the first and second digital data being reproduced by the main body. The first digital data are oversampled at a frequency n times the sampling rate of the first digital data. The first digital data oversampled by the filter device and the second digital data input via the interface are added together, and the resulting data are converted into an analog signal.

9 Claims, 8 Drawing Sheets

DIGITAL DATA REPRODUCING APPARATUS AND METHOD, DIGITAL DATA TRANSMITTING APPARATUS AND METHOD, AND STORAGE MEDIA THEREFOR

BACKGROUND OF THE INVENTION

1. Field of the Invention

The present invention relates to a digital data reproducing apparatus and method that include a digital interface for receiving digital data such as audio data from an external device independent of a main body of the apparatus and reproduce the digital data via the main body, and a storage medium storing a program for realizing the method, and also to a digital data transmitting apparatus and method that transmit digital data via the main body, y, and a storage medium storing a program for realizing the method.

2. Prior Art

There is known a system that includes a digital interface for receiving digital data such as audio data from an external device independent of a main body of the system, and records or reproduces the digital data received by the interface, in the main body. In this system, the digital data from the interface are processed using a clock signal which is synchronized with both the operation of the main body and that of the interface. Alternatively, in order to achieve synchronization in operation between the external device and the main body, a sophisticated digital signal processing circuit is used to perform sampling rate conversion on the digital data from the interface to realize the same sampling rate between the external device and the main body.

Such clock synchronization may be achieved in several ways. For example, a master clock signal may be output from the main body and supplied to the external device which drives an external digital source. Or, a phase locked loop (PLL) may be provided within the main body to generate a clock signal in synchronism with a clock signal applied to process the digital data input from the external interface so that the main body is driven using this clock signal. These processing methods cannot be carried out, however, unless a sampling rate employed by the external digital source is the same as that employed by the main body. When the two sampling rates are different, it is a general practice to process data themselves from the external digital source by performing sampling rate conversion on the data to thereby obtain the same sampling rate between the external device and the main body.

In the prior art, as described above, a PLL or an elaborate sampling rate conversion circuit is required to achieve the clock synchronization, leading to a significant increase in cost. Besides, the PLL cannot accommodate itself to data with different sampling rates. Also, conversion of the sampling rate by the sampling rate converter circuit makes it impossible to record and transmit digital data that are faithful to the original data.

The method of processing data themselves by sampling rate conversion is applicable to most conventional audio data, since the conversion of the digital data themselves does not give rise to any problem. However, this method cannot be applied to case where the digital data are encoded digital data such as compressed data, or to case where digital information data which, unlike audio-visual data, do not allow data conversion and are transmitted using an existing format at a sampling rate for audio data.

SUMMARY OF THE INVENTION

It is a first object of the present invention to provide a digital data reproducing apparatus and method that are capable of reproducing both digital audio data from a main body of the apparatus and digital data from an external interface, using a simple construction, and a storage medium storing a program for realizing the method.

It is a second object of the present invention to provide a digital data transmitting apparatus and method that are capable of recording and transmitting received digital data of any kind in a state faithful to the original data, using a simple construction without converting the data, and a storage medium storing a program for realizing the method.

To attain the first object, according to a first aspect of the present invention, there is provided a digital data reproducing apparatus comprising a main body that processes first digital data, an interface that receives, from an external device independent of the main body, second digital data having a sampling rate asynchronous with and different from a sampling rate of the first digital data and which have a different sampling rate, the first and second digital data being reproduced by the main body, a filter device that oversamples the first digital data at a frequency n times the sampling rate of the first digital data, an adder that adds together the first digital data oversampled by the filter device and the second digital data which are input via the interface, and a converter that converts digital data resulting from addition by the adder into an analog signal.

In a preferred form of the first aspect, the interface carries out zero-order holding of the second digital data and supplies the zero-order held data to the adder.

Alternatively, the interface carries out linear interpolation of the second digital data and supplies the linear interpolated data to the adder.

To attain the second object, according to a second aspect of the present invention, there is provided a digital data transmitting apparatus comprising a first interface that transmits first digital data at a first sampling rate, a second interface that transmits second digital data at a second sampling rate which is asynchronous with and independent of the first sampling rate, a main line control device that transmits in an intermittent manner the first digital data which are received from the first interface, together with a first flag. to the second interface using a main line, and an auxiliary line control device that is enabled transmits, when the first sampling rate is greater than the second sampling rate, for transmitting an overflow of the first digital data occurring due to transmission of the first digital data by the main line alone, together with a second flag, to the second interface using an auxiliary line.

In a preferred form of the second aspect, the digital data transmitting apparatus comprises a filter device that oversamples the second digital data received from the second interface at a frequency n times the second sampling rate, an adder that adds together the first digital data received from the first interface and the second digital data oversampled by the filter device, and a converter that converts digital data resulting from addition by the adder into an analog signal.

To attain the first object, according to a third aspect of the present invention, there is provided a digital data reproducing method comprising the steps of processing first digital data by a main body device, receiving, by means of an interface, from an external device independent of the main body, second digital data having a sampling rate asynchronous with and different from a sampling rate of the first digital data, the first and second digital data being reproduced by the main body device, oversampling the first digital data at a frequency n times the sampling rate of the first digital data, adding together the first digital data oversampled by the oversampling step and the second digital data which are input via the interface, and converting digital data resulting from addition by the adding step into an analog signal.

To attain the second object, according to a fourth aspect of the present invention, there is provided a digital data transmitting method comprising the steps of transmitting, by means of a first interface, first digital data at a first sampling rate, transmitting, by means of a second interface, second digital data at a second sampling rate which is asynchronous with and independent of the first sampling rate, transmitting in an intermittent manner the first digital data which are received from the first interface, together with a first flag. to the second interface using a main line, and transmitting an overflow of the first digital data occurring due to transmission of the first digital data by the main line alone, together with a second flag, to the second interface using an auxiliary line when the first sampling rate is greater than the second sampling rate.

To attain the first object, according to a fifth aspect of the present invention, there is provided a storage medium storing a program which can be executed by a computer, for realizing the above described digital data reproducing method.

To attain the second object, according to a sixth aspect of the present invention, there is provided a storage medium storing a program which can be executed by a computer, for realizing the above described digital data transmitting method.

According to the first, third, and fifth aspects of the present invention, the first digital data obtained by oversampling with the filter device at a frequency n times the sampling frequency thereof, and the second digital data that are input via the interface are directly added together by the adder. This allows the second digital data having a sampling rate quite different from that of the first digital data to be transmitted with their characteristics unchanged to be digital-to-analog converted. This enables digital audio data both from the main body and from the external device to be reproduced using a simple construction.

According to the second, fourth, and sixth aspects of the present invention, the first digital data input from the first interface are intermittently transmitted together with the first flag to the second interface, using the main line by the main line control device. On the other hand, when the first sampling rate is higher than the second sampling rate, an overflow of the first digital data that occurs due to the transmission of the first digital data via the main line is transmitted together with the second flag to the second interface using the auxiliary line by the auxiliary line control device. This enables digital data of any kind to be recorded and transmitted in a state faithful to the original data without converting the received digital data, using a simple construction The above and other objects of the Invention will become more apparent from the following detailed description taken in conjunction with the accompanying drawings.

DETAILED DESCRIPTION OF PREFERRED EMBODIMENTS

The present invention will now be described in detail with reference to the drawings showing embodiments thereof.

A. First Embodiment

Figure 1:
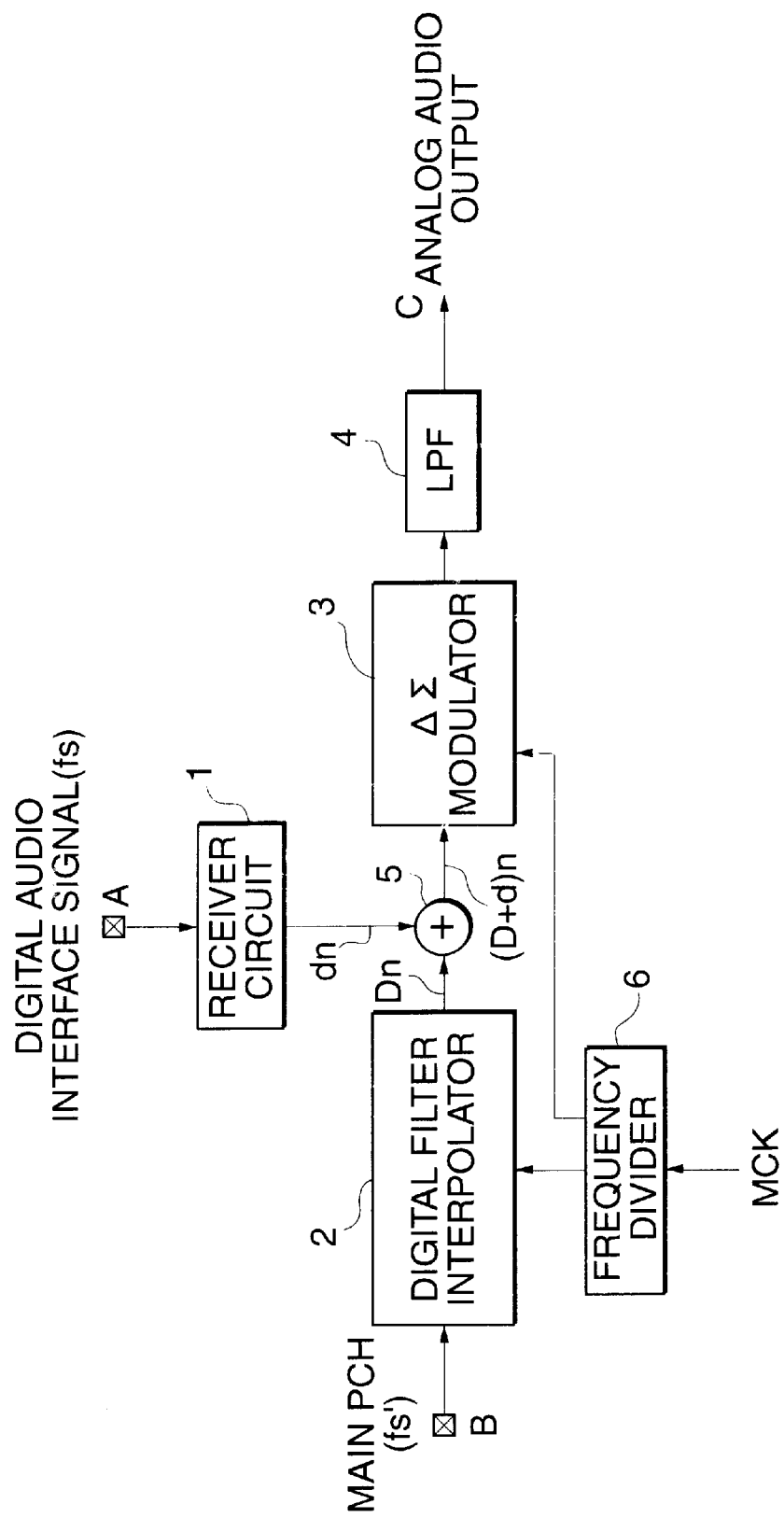
FIG. 1 is a circuit diagram showing the construction of an audio playback apparatus as a digital data reproducing apparatus according to a first embodiment of the present invention.

FIG. 1 is a circuit diagram showing the construction of an audio playback apparatus as a digital data reproducing apparatus according to a first embodiment of the present invention. In the figure, symbol A represents an input terminal through which a digital audio signal (digital data) is input from an external device, not shown. The input digital data have a sampling rate dependent on the sampling frequency fs of the audio signal, and inherent timing or format. Symbol B represents an input terminal through which a main digital audio signal (main signal) is input as the main digital data to be reproduced by the present apparatus. The main digital audio signal has a predetermined sampling rate fs'.

A receiver circuit 1 serves as an interface which receives the digital audio signal that is input via the input terminal A, converts the received signal to parallel data dn and supplies the same to a digital adder 5. A digital filter circuit 2 oversamples the main digital audio signal that is input via the input terminal B, and after low-pass filtering, supplies it as data Dn to the digital adder 5. The digital adder 5 digitally adds the data dn and data Dn, and supplies the resulting data (D+d)n to a delta-sigma ($\Delta\Sigma$) modulator 3. The delta-sigma modulator 3 performs delta-sigma ($\Delta\Sigma$) modulation on the data (D+d)n, converts the data into 1-bit stream data and supplies the same to a low-pass filter 4. The low-pass filter 4 is an analog circuit having a D/A (digital-to-analog) conversion function and converts the 1-bit stream data obtained by the above-mentioned delta-sigma modulation into an analog audio signal. A frequency divider 6 frequency-divides a master clock MCK in synchronism with the above-mentioned sampling rate fs' and supplies the resulting clock to the digital filter circuit 2 and the delta-sigma modulator 3 for use in carrying out the filtering by the digital filter circuit 2 and the delta-sigma modulation by the delta-sigma modulator 3.

The construction of the present embodiment is characterized in that the data Dn that are output from the digital filter circuit 2 which processes the main signal are parallel data obtained by oversampling the main signal at a frequency n times the sampling rate fs', and that the data Dn and the parallel data dn that are input via the input terminal A and output from the receiver circuit 1 are directly digitally added together by the digital adder 5, and the resulting data from the adder 5 are D/A converted by the above-described processing. Here, it should be noted that both the digital data are directly added together even if the sampling rate fs and the sampling rate fs' are asynchronous with and quite different from each other.

To this end, the receiver circuit 1 may be any circuit that can convert the digital audio signal from the interface into parallel data. Thus, the zero-order held digital data dn and the digital data Dn that are obtained by oversampling at a frequency (n×fs'), n times the sampling rate fs', are added together. The parallel data dn are updated at least at the frequency of the sampling rate fs of the digital audio signal that is input via the input terminal A. As a consequence, a digital addition is carried out at the frequency n×fs', and the characteristics based on the quite different sampling rate fs are also transmitted, as they are, to the low-pass filter 4 to be subjected to D/A conversion.

Strictly speaking, there arises an asynchronous error at points where the data dn change, but this is of the order of 1/(n×fs). Thus, the D/A converted audio data have the distortion characteristics deteriorated due to slight folding noise and a rate error variation of 1/(n×fs). However, reproduction of the audio data is possible without causing any feeling of discomfort to the auditory sense, since, after the oversampled data are added together, noise is also subjected by the delta-sigma modulator 3 to shaping to a high frequency range outside the audible range. This technique may be regarded as a kind of sampling rate conversion processing. According to the present first embodiment, among the various constructions that are needed for processing the original main signal, one of the most cost-effective means can be realized for the simultaneous processing the external audio data.

B. Second Embodiment

Figure 2:
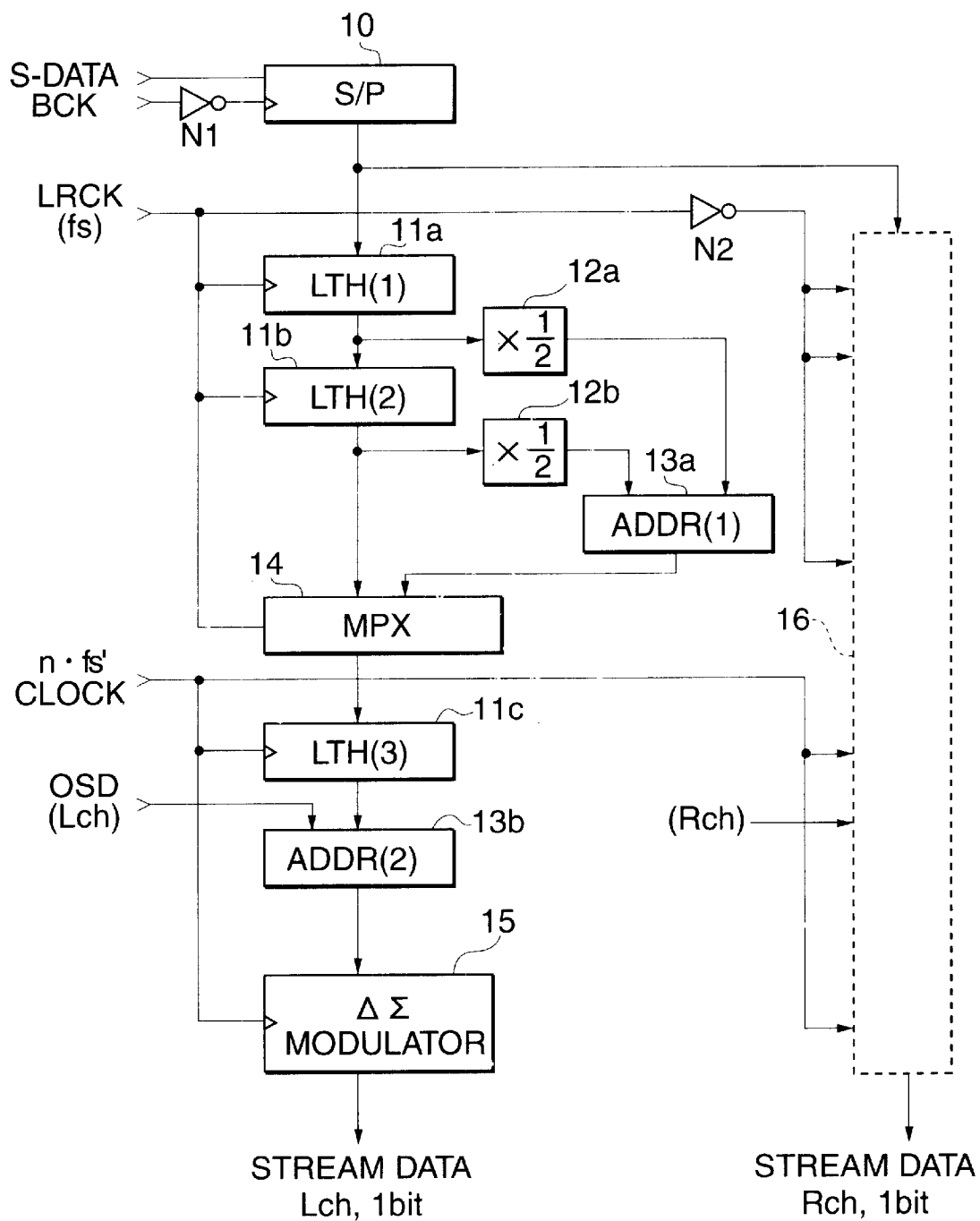
FIG. 2 is a circuit diagram showing the construction of an audio playback apparatus as a digital data reproducing apparatus according to a second embodiment of the present invention.

In the first embodiment described above, the data obtained by zero-order holding of digital audio data from the external device by the receiver circuit 1 are processed. However, the present invention is not limited to this construction, but linear-interpolated data may be generated from the external digital audio data. FIG. 2 is a circuit diagram showing the construction of an audio playback apparatus according to a second embodiment of the present invention. In the figure, a serial-parallel (S/P) converter 10 serves as an interface for converting 2-channel stereophonic data (digital audio data) S-DATA that are input from an external digital interface, not shown, into parallel data. Reference numerals N1 and N2 denote inverter circuits, 11a to 11c are parallel data latch circuits, 12a and 12b are dividers for halving the gain of the digital audio data, 13a and 13b are digital adders, 14 is a switching circuit for selecting one of two sequences of parallel data, and 15 is a delta-sigma modulator. The above-mentioned components constitute a processing circuit on the left channel Lch side. Reference numeral 16 denotes a processing circuit on the right channel Rch side that has the same construction as the processing circuit Lch on the left channel Lch side.

The 2-channel stereophonic data (digital audio data) S-DATA that are received from the external digital interface are subjected to serial/parallel conversion by the serial-parallel converter 10 into parallel data, and the Lch data of the parallel data are latched by the latch circuit 11a. The latch circuit 11a is supplied with a signal LRCK having the sampling frequency fs that depends on the sampling rate fs of the aforementioned external digital interface as a latch signal. The gain of a part of the data from the latch circuit 11a is halved or attenuated to half the original gain by the divider 12a. The rest of the data are delayed and latched by the latch circuit 11b with the signal LRCK. The gain of a part of the data from the latch circuit 11b is attenuated to half the original gain by the divider 12b. The two pieces of data from the dividers 12a and 12b are added together by the adder 13a. Thus, the adder 13a generates a so-called average value that is eventually obtained by adding the two pieces of data which are successive in time sequence and dividing the resulting sum by 2.

Then, double oversampling data interpolated with the average value are obtained by switching between the above-described average value from the adder 13a and the raw data from the divider 12b at a switching rate 2 fs using the switching circuit (MPX) 14. Then, the average value from the adder 13a and the original data from the divider 12b are alternately selected at a rate of 2 fs by the switching circuit (MPX) 14 to obtain double-oversampled data of the original data interpolated by the average value. The output data that are switched at the frequency of 2 fs from the switching circuit 14 are latched by the latch circuit 11c with a clock of a frequency n×fs' that is used to process the main audio signal, and then the output data from the latch circuit 11c are digitally added by the adder 13b to the oversampled interpolated data OSd which are obtained by oversampling the main audio data at the frequency of n×fs which is n times the sampling frequency fs'. The resultant data are delta-sigma modulated by the delta-sigma modulator 15, to be output as 1-bit stream data for the left channel Lch.

Data for another the other channel Rch are processed in the same manner as above by the data processing circuit 16.

It is also possible to easily realize an embodiment having a circuit construction that multichannel data are multi-processed in a time-sharing manner using a clock having a higher frequency as the processing clock, according to the above described processing manner.

Figure 3:
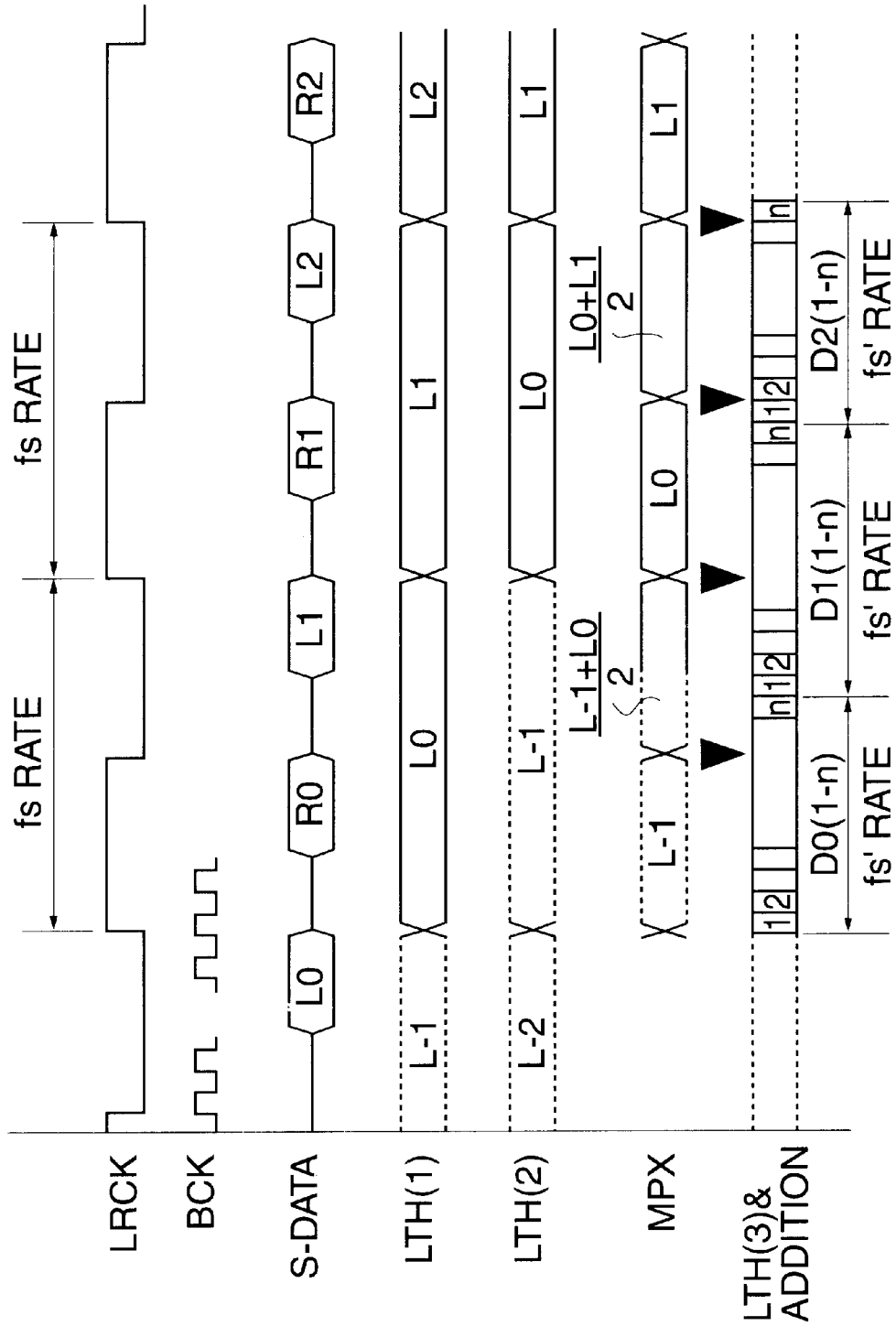
FIG. 3 is a timing chart useful in explaining the operation of the audio playback apparatus of FIG. 2.

Next, a data processing operation performed by the audio playback apparatus of the second embodiment as constructed as above will be described in detail with reference to a timing chart shown in FIG. 3. The audio playback apparatus according to the present embodiment employs a construction that receives an interface signal which is well known as a three-line format signal consisting of signals LRCK, BCK, and S-DATA. Thus, if the Lch, Rch data after the serial/parallel conversion are latched at the leading edge of the signal LRCK, the Lch data are extracted, and if they are latched at the trailing edge of the signal LRCK, the RCH data are extracted. The extracted data are held during the fs rate period. This operation can be realized in the same manner using signals of other known formats such as I2S, SPDIF (Standard EIAJ/CP1201), insofar as the interface signal is of a type dependent on an audio sampling rate, and parallel data can be extracted with a period of the sampling rate.

The data S-DATA are held in the latch circuit 11a, as mentioned above. If the data S-DATA were directly supplied to the latch circuit 11c as they are, and added to data obtained by oversampling the main audio signal, the construction is the same as in the first embodiment described above in which the zero-order held data are digitally added to the oversampled data of the main audio signal. To generate linear interpolated data, the data S-DATA are further delayed by the latch circuit 11b to obtain two pieces of data (Ln and Ln+1) which are consecutive in time, and the gain of the respective digital audio data is attenuated to ½ of the original gain. In practice, in order to attenuate the gain of digital data expressed in two's complements to ½ of the original gain, it is sufficient to provide a circuit for simply shifting the digits by one bit. The average value (Ln+Ln+1)/2 can be obtained by adding together these two pieces of gain-attenuated data.

Double oversampling data can be generated by switching data in the timing of the signal LRCK to obtain a sequence of data such as Ln, (Ln+Ln+1)/2, Ln+1, and by thus interpolating data of fs rate period. The two pieces of data are then alternately selected in the timing of the signal LRCK to obtain a sequence of data such as Ln, (Ln+Ln+1)/2, Ln+1, which are double oversampled data of data within the fs rate period interpolated with the average value. These data are added to the data obtained by oversampling the main audio signal at the sampling rate of n×fs', addition is performed even if the two sampling rates fs and fs' are quite different from each other. A problem with this addition, if any, may arise that portions of the data before and after the time-points of data switching as shown by a mark ▼ in FIG. 3, have an error of accuracy of the frequency r×fs', causing jitter in the initial fs rate. However, such jitter can be fully suppressed adequately by employing a sufficiently high order of oversampling, for example, 128 times the sampling frequency fs', for processing the main signal, so that satisfactory performance can be obtained in terms of auditory perception.

C. Third Embodiment

The first and second embodiments as described above are directed to a system for reproducing asynchronous digital audio data in sounds. On the other hand, a system for recording or preserving the data in the form of original data is often required. To apply the present invention to such a system, it is only required that an external interface receiver unit and components including a recording medium (large scale memory or the like) are integrated as a part of the main body. In a current system of this kind in general, however, these components are separated, and a computer memory or a hard disk, DAT (digital audio tape) or MD (micro-disk) is used as recording devices. Data communication is necessary between these recording devices and their controllers, or a CPU (central processing unit) or its peripherals in the case of a computer. The data communication may be performed in any format of its own, but is generally mediated by a common interface.

In accordance with According to a third embodiment of the present invention, there is provided a circuit which can be adapted/expanded to match all kinds of such a format, and which receives data from an external digital interface and converts the same into digital interface data of a different format. In the present third embodiment, in particular, a digital interface IF1 (input side) that depends on a digital audio sampling rate fs is connected to an input terminal A, and a digital interface IF2 (output side) that depends on a different sampling rate fs' is connected to an output terminal B. Of course, the sampling rates fs and fs' are independent of and asynchronous with each other. With this connection, if fs<fs', the number of samples that can be transmitted per unit time is greater than the number of samples received per unit time so that data can be intermittently sent to the interface IF2. Effective data and ineffective data may be transmitted together with flags, and this method is known.

Figure 4:
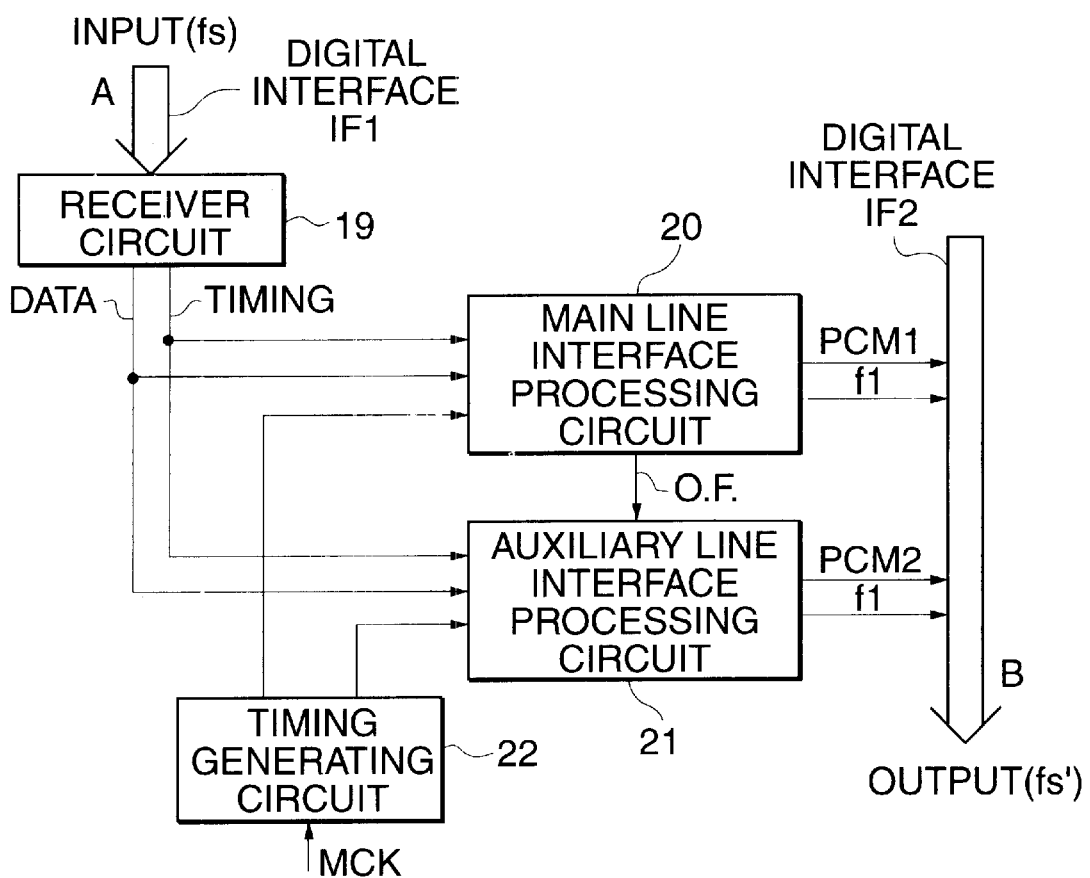
FIG. 4 is a circuit diagram showing the construction of an interface conversion circuit of a digital data transmitting apparatus according to a third embodiment of the present invention.

FIG. 4 is a circuit diagram showing the construction of an interface conversion circuit according to the third embodiment of the present invention. In the figure, reference numeral 19 denotes a receiver circuit which receives data from the digital interface IF1, and which supplies the data and a timing signal to a main line interface processing circuit 20 and to an auxiliary line interface processing circuit 21. The main line interface processing circuit 20 is for realizing the above described operation. The present embodiment can be regarded as an extension of the above described method. For example, if fs>fs', since the number of samples that are received is greater than the number of samples that can be transmitted, and therefore the auxiliary line processing circuit 21 is provided to deal with overflowing data. Thus, the auxiliary line processing circuit 21 transmits data that overflow from the main line processing circuit 20 by controlling and assigning the data with flags into to a plurality of lines using flags. A timing generator 22 divides a master clock MCK and supplies the resulting clock to the main line interface processing circuit 20 and the auxiliary line interface processing circuit 21.

The digital interface IF2 on the output side may have any format. For example, it may be provided with a plurality of output formats for the main line processing circuit 20. Alternatively, it may have such a format that the sampling rate period of 1 fs' is divided into a plurality of slots or packets to enable a great deal of data to be transmitted at one time. In this case, besides slots dedicated to the main line processing circuit 20, data are transmitted to the slots allotted to the auxiliary line processing circuit 21.

Figure 5:
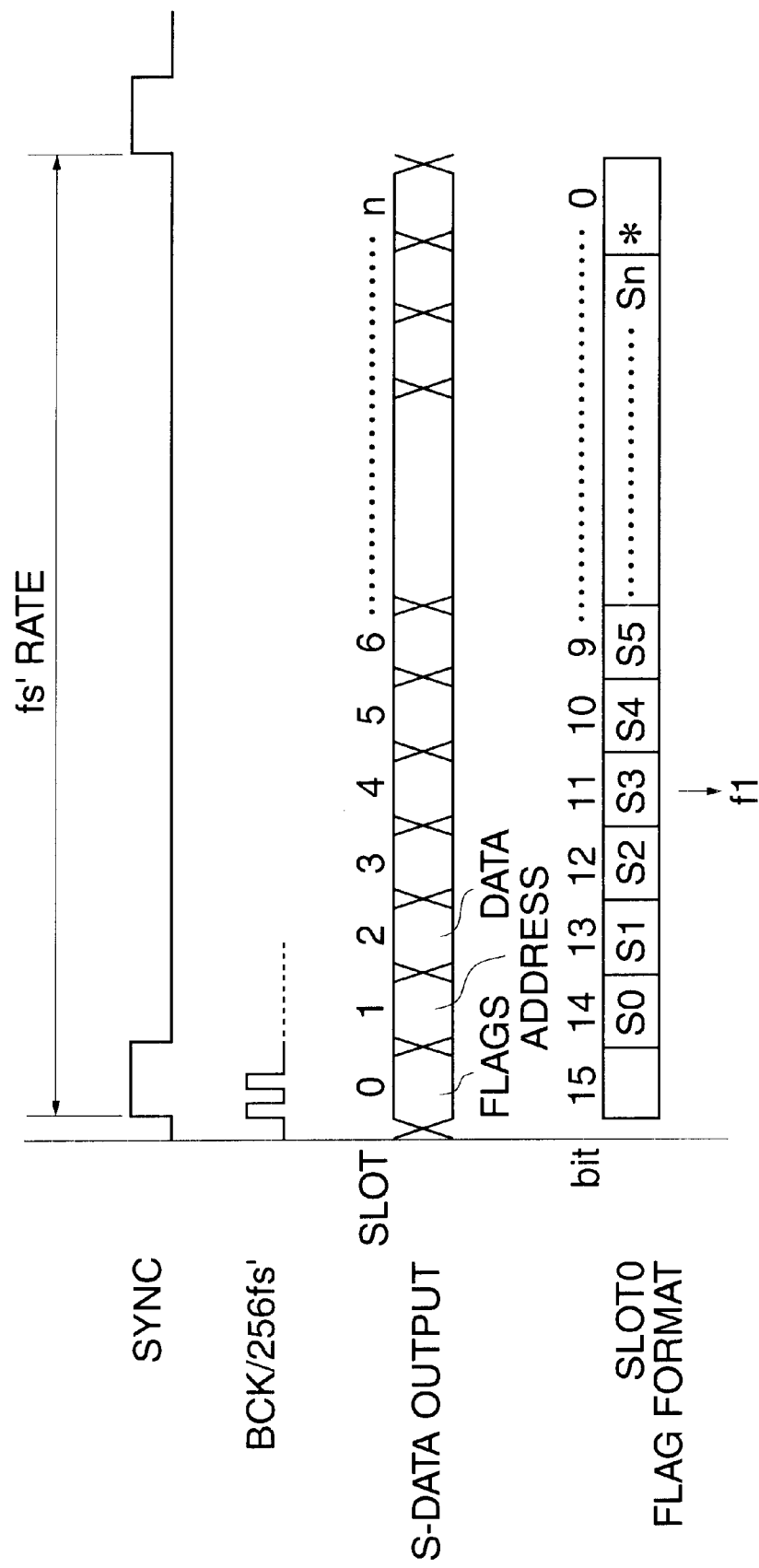
FIG. 5 is a timing chart showing an example of format employed by a conventional digital interface.

The method of transmitting a great deal of data by means of slot division as described above has been already implemented. The structure of a data transmission system using this method, cited from Audio Codec '97 Rev.2.1 Version (May 22, 1998) which was made public by Intel Corporation as Audio Codec specifications for PC (personal computer) will be described with reference to FIG. 5. This system will be hereinafter abbreviated as AC97. The AC97 interface consists of four lines, that is, SYNC, BCK, S-DATA-IN and S-DATA-OUT. This interface resembles the conventional three-line interface except that the bit clock BCK is a high speed clock with a frequency of 256 fs' to allow data S-DATA to be divided into slots, thereby enabling a great deal of data and commands to be transmitted.

Data are separated only into two buses, that is, into an lines, i.e. input and output lines, and in this sense, The interface has a construction similar to the three-line construction. The data line is divided into 13 slots with only a slot 0 being composed of 16 bits and containing flags, and all the other slots being each composed of 20 bits. A slot 1 contains a control address, slot 2 control data, and slots 3 and 4 stereophonic left and right channel data Lch/Rch of the main signal. Since a great deal of data can thus be transmitted by multiplex transmission at a high frequency, the signal LRCK that distinguishes between the left channel and the right channel alone is no longer used and replaced by a signal SYNC indicative of the format top that is generated at the rate of cycle fs'.

The format frame of the AC97 interface is defined to be used at a fixed rate of fs'=48 kHz. Although the format is of a fixed rate, the interface is intended to process digital audio data or the like to be treated are supposed to which have an arbitrary sampling frequency. That is, flags (respective bits of the slot 0) are used to indicate whether each slot data of each slot are effective or ineffective. With this construction, the second object of the present invention can be easily attained by assigning data on the auxiliary line and flags to slots other than those of the main line.

Figure 6:
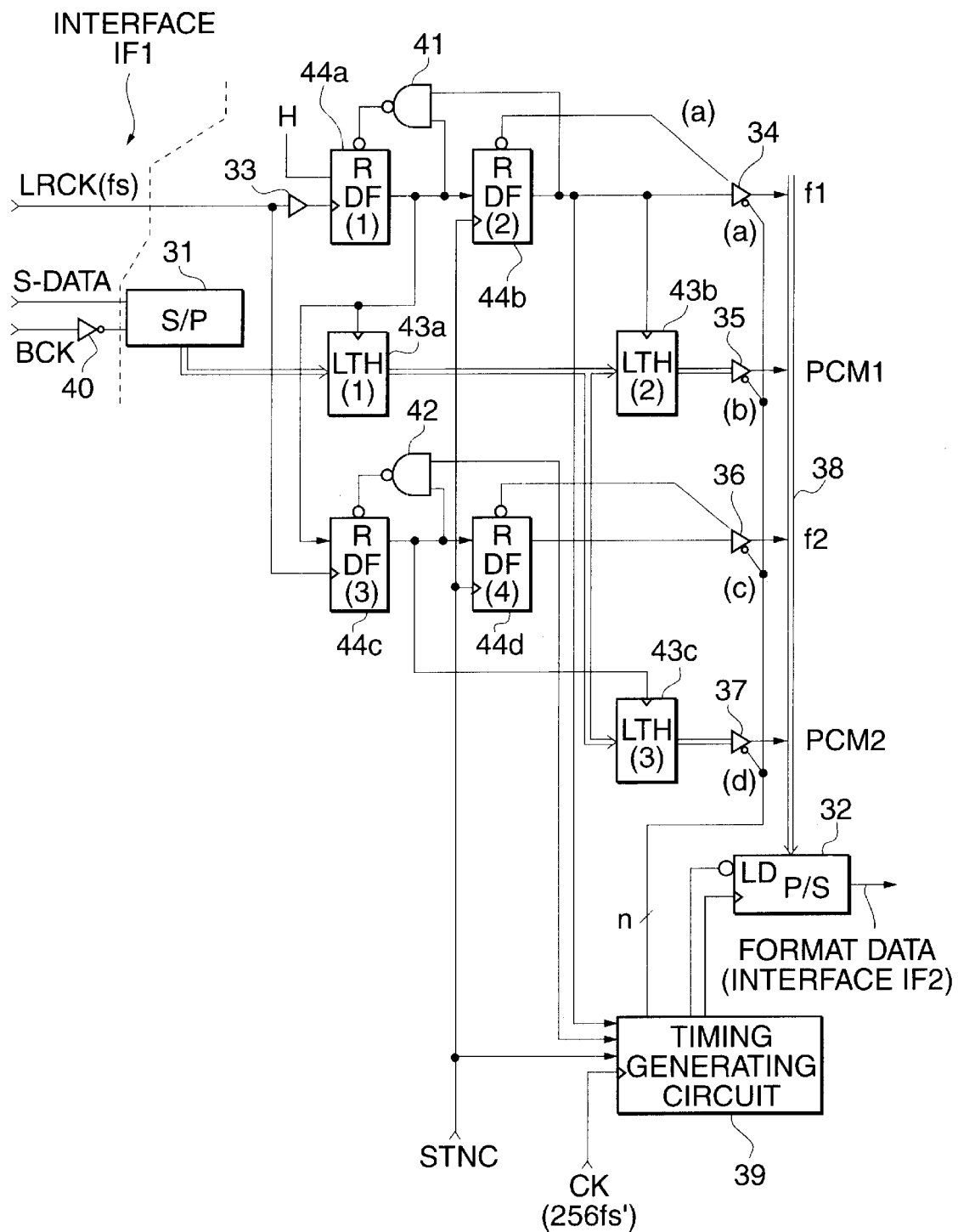
FIG. 6 is a circuit diagram showing the construction of an example of main/auxiliary line interface processing circuit employed in the digital data transmitting apparatus according to the third embodiment.

FIG. 6 is a circuit diagram showing an example of the construction of the main or auxiliary line interface processing circuit employed in the third embodiment of the present invention. In the figure, reference numeral 31 denotes a serial-parallel conversion circuit, and 32 denotes a parallel-serial conversion circuit. 33 is a delay circuit, 34 to 37 are bus-driver 3-state circuits, 38 is a bus line, 39 is a timing generating circuit, 40 is an inverter circuit, 41 and 42 are NAND circuits, 43a to 43c are parallel data latch circuits, and 44a to 44d are flip-flop circuits. The construction illustrated in FIG. 6 adopts the three-line signal format as described before is adopted for the input interface, and the above-mentioned AC97 interface is adopted for the output interface, and is used for processing left channel data (Lch) alone.

The serial-parallel conversion circuit 31 receives serial data S-DATA from the digital interface IF1 with a sampling rate of fs, and latches Lch data in and delivers the data to the latch circuit 43a to latch the same. In the timing determined by the sampling rate fs', data are supplied from the latch circuit 43a to and latched in the latch circuit 43b to latch the same. When the data are thus latched, the flip-flop circuits 44a, 44b and the NAND circuit 41 operate so as to perform a flag operation of outputting a flag f1. In the timing (a) and (b) (FIG. 7) in accordance with the AC97 interface format, the flag f1 and data PCM1 from the latch circuit 43b which are ready to be output are driven to the bus 38. The data are then output from the parallel-serial conversion circuit 32 together with various other format data to the interface IF2, not shown, and at the same time the flag f1 is cleared or reset.

The operation of the interface conversion processing circuit according to the present embodiment as the main line interface processing circuit has been described above. As described before, when fs>fs' holds so that the number of received samples is greater than the number of transmitted data PCM1, this processing circuit operates as the auxiliary interface processing circuit. This operation will be described below. When the flip-flop circuit 44a as a flag circuit for the main line interface is set and the next sample is received, that is, when an overflow occurs, the flip-flop circuit 44c as a flag circuit for the auxiliary line interface is set. Once the flip-flop circuit 44c is set, data latched and updated by the latch circuit 43a flow to the latch circuit 43c. Then, the main line and the auxiliary line transmit data simultaneously in a corresponding SYNC frame at the same time. Of course, a slot or slots allotted to the auxiliary line are different from those allotted to the main line. The bus-driving timing is shown by symbol (d) in FIG. 7. The timings (a) to (d) are controlled by the timing generating circuit 39 depending upon which slots are to carry the data and/or whether the data are effective. According to the AC97 format, the flags for the main line and the auxiliary line are allotted to different bits of the slot 0 so that, in practice, the timings (a) and (c) for outputting the flag f1 for the main line and the flag f2 for the auxiliary line, respectively, are the same.

Figure 7:
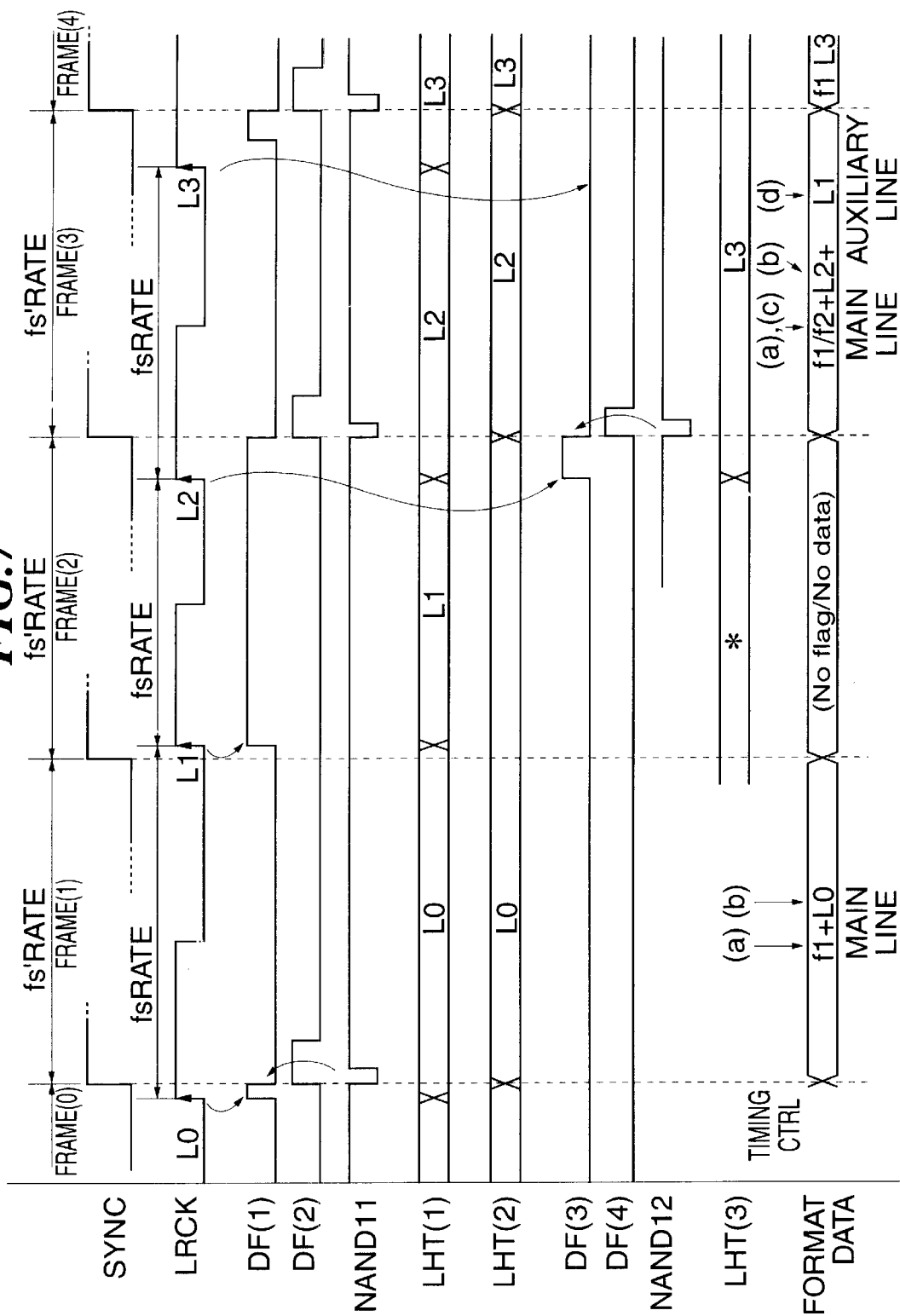
FIG. 7 is a timing chart useful for explaining the operation of the interface conversion circuit of FIG. 6.

The above-mentioned operation will be described more in more detail with reference to the timing chart of FIG. 7. In the figure, only operations occurring around the leading edge of the signal SYNC are shown in a simplified manner. The period of time from a leading edge of the signal SYNC to the next leading edge of the signal SYNC is a frame of the sampling rate fs'. As regards the signal LRCK with the sampling rate fs, on the other hand, various cases are shown in frames (0) to (4) when the signal LRCK is asynchronous with and has a different rate from that of the signal SYNC. At each leading edge of the signal LRCK, the received data are latched and updated by the latch circuit 43a. At the same time, the flip-flop circuit 44a is set in response to the leading edge of the signal LRCK, and the flag f1 is subsequently latched to the flip-flop circuit 44b at a leading edge of the signal SYNC immediately following the signal LRCK. At this time, the flip-flop circuit 44a is reset by an output of the NAND circuit 41 and simultaneously the data are latched by the latch circuit 43b by the flag f1 transferred to the flip-flop circuit 44b.

This is an asynchronous absorbing operation for transmitting data extracted in the immediately preceding SYNC frame in the next SYNC frame in accordance with the flag. The flag f1 is output in the timing (a) corresponding to the slot 0 of the SYNC frame (1), and data L0 are output in the timing (b) corresponding to a certain specific slot.

The flag f1 that is latched to the flip-flop circuit 44b is cleared at the time point (timing (a)) it is output to the format of the interface IF2. In the frame (1), there is no data received, and accordingly neither flag nor data are set as the format data to be output in the frame (2). Exactly speaking, both the flag and data are fixed to 0 and output.

In the next frame (2), two samples are received in response to the signal LRCK in the same frame. First, upon receiving the first data L1, the flag f1 is set to the flip-flop circuit 44a, and when the second data L2 are received, it is determined from the status of the flip-flop circuit 44a that this is the second reception in the same frame. Accordingly, the flip-flop circuit 44c is set, and at the same time the data L1 are latched to the latch circuit 43c and data in the latch circuit 43a are updated to the newly received data L2.

As shown in FIG. 6, the delay circuit is inserted to ensure proper timing for transferring data to the latch circuit 43c. As described above, the circuits for the auxiliary line do not operate unless data reception occurs twice in a same frame, and the latch circuit 43c holds data until the next two-sample reception occurs. Therefore, in the following SYNC frame (3), the data L2 can be output as the main line data to the slot for the timing (b), and the data L1 can be output as the auxiliary line data to the slot for the timing (d), together with the flags f1 and f2 (in the timing (a) and (c) for the slot 0).

Specifications of the interfaces have to be set such that when data are simultaneously output to the main line and the auxiliary line at the same time, data in the auxiliary line are always given priority in the order of time sequence.

D. Fourth Embodiment

Figure 8:
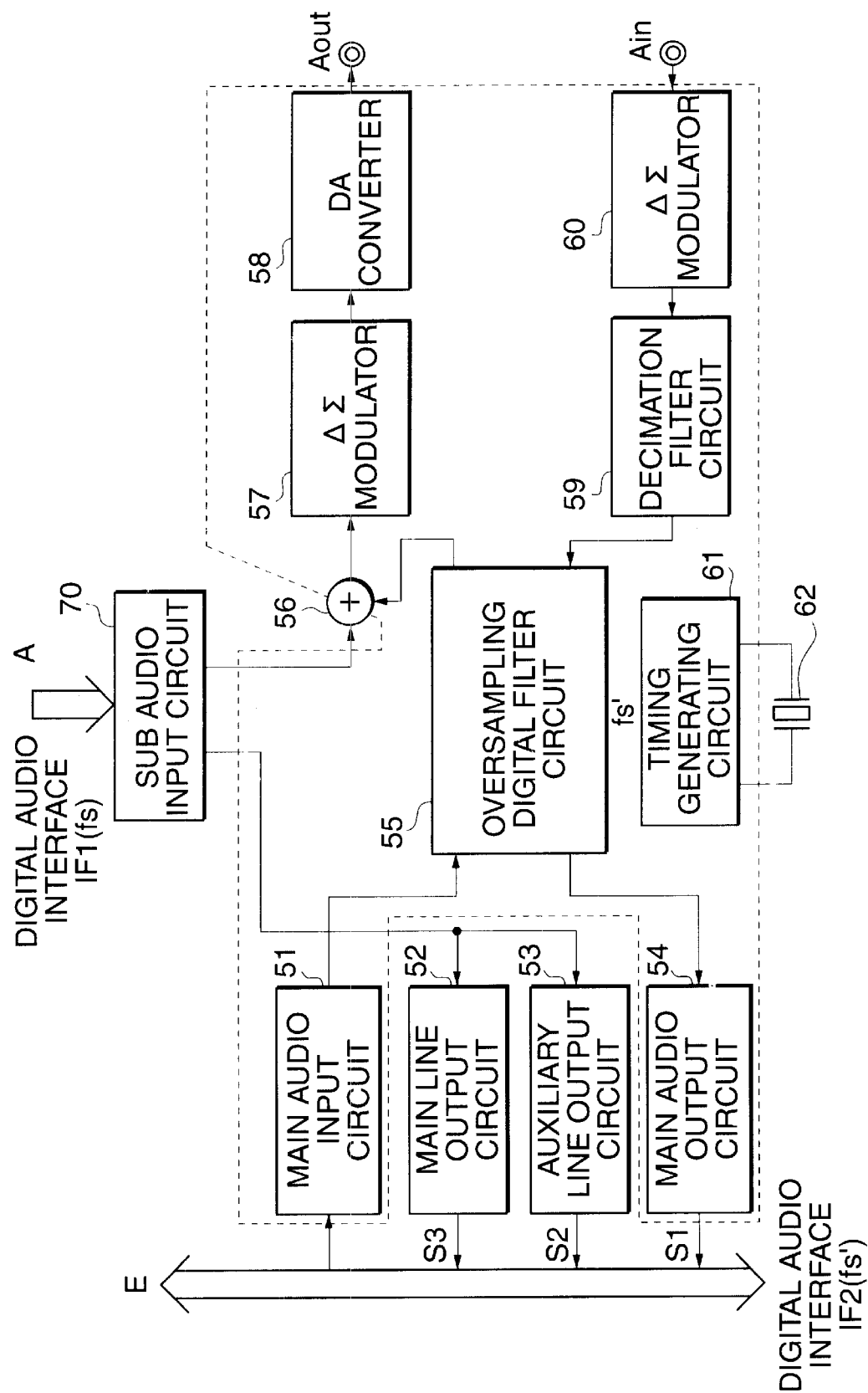
FIG. 8 is a circuit diagram showing the construction of a digital data transmitting apparatus according to a fourth embodiment of the present invention.

Next, a fourth embodiment of the present invention will be described, which is an application of the present invention to a single codec system having A/D and D/A conversion functions. FIG. 8 is a circuit diagram showing the construction of an apparatus according to the fourth embodiment of the present invention. In the figure, symbol E denotes an interface of this codec system having, for example, the AC97 format. Reference numerals 51 to 54 denote main digital audio signal input/output circuits according to the above-mentioned interface. 55 denotes an oversampling digital filter circuit. 57 is a delta-sigma ($\Delta\Sigma$) modulator, 58 is a D/A converter, 59 is a decimation filter circuit, 60 is a delta-sigma ($\Delta\Sigma$) modulator, 61 is a timing generating circuit, and 62 is a quartz oscillator.

In the figure, a region enclosed by a broken line represents a system which is realized by a conventional single chip codec LSI or the like. To expand this system is to be expanded so as to be adapted to a sub audio source provided with an asynchronous digital interface IF1, a sub audio input circuit (receiver circuit) 70 is provided, and as regards a reproduction bus therefor is implemented by an arrangement that main audio data and sub audio data are added together by a digital adder 56, as in the first embodiment described above with reference to FIG. 1 above. A recording side is implemented by an arrangement consisting only of a main line output circuit 52 and an auxiliary line output circuit 53 to incorporate a recording/reproducing function for the sub audio source in a simple and inexpensive manner.

Even if the audio source supplies two-channel stereophonic data, by using S1 to S3, and thus six slots in total as represented by S1 to S3 may be provided to make it possible to divide the main/sub audio data into the main line and the auxiliary line and to transmit them at the same time.

It is to be understood that the present invention may also be realized by supplying a system or an apparatus with a storage medium in which the program code of software that realizes the functions of the above described embodiments is stored, and causing a computer (or CPU, MPU) of the system or apparatus to read out and execute the program code stored in the storage medium. In this case, the program code itself read out from the storage medium realizes the above described functions of the embodiments, so that the storage medium storing the program code also constitutes the present invention.

The storage medium for supplying the program code may be selected from, for example, a floppy disk, hard disk, optical disk, magneto-optical disk, CD-ROM, CD-R, magnetic tape, non-volatile memory card, and ROM.

It is to be understood that the functions of the above described embodiments may be accomplished not only by executing the program code read by a computer, but also by causing an operating system (OS) that operates on the computer, to perform a part or the whole of the actual processings according to instructions of the program code.

Furthermore, the program code read out from the storage medium may be written into a memory provided in an expanded board inserted in the computer, or an expanded unit connected to the computer, and a CPU, or the like, may actually perform a part or all of the processings according to the instruction of the program code, so as to accomplish the functions of the above described embodiments.

What is claimed is:

1. A digital data reproducing apparatus comprising:

a main body that processes first digital data;

an interface that receives, from an external device independent of said main body, second digital data having a sampling rate asynchronous with and different from a sampling rate of said first digital data and which have a different sampling rate, said first and second digital data being reproduced by said main body;

a filter device that oversamples said first digital data at a frequency n times said sampling rate of said first digital data;

an adder that adds together the first digital data oversampled by said filter device and the second digital data which are input via said interface; and a converter that converts the digital data resulting from addition by said adder into an analog signal.

2. A digital data reproducing apparatus according to claim 1, wherein said interface carries out zero-order holding of said second digital data and supplies the zero-order held data to said adder.

3. A digital data reproducing apparatus according to claim 1, wherein said interface carries out linear interpolation of said second digital data and supplies the linear interpolated data to said adder.

4. A digital data transmitting apparatus comprising:

a first interface that transmits first digital data at a first sampling rate;

a second interface that transmits second digital data at a second sampling rate which is asynchronous with and independent of said first digital data and which has a second sampling rate;

a main line control device that transmits in an intermittent manner the first digital data which are received from said first interface, together with a first flag to said second interface using a main line; and an auxiliary line control device that is enabled transmits, when said first sampling rate is greater than said second sampling rate, for transmitting an overflow of the first digital data occurring due to transmission of said first digital data by said main line alone, together with a second flag, to said second interface using an auxiliary line.

5. A digital data transmitting apparatus according to claim 4, further comprising:

a filter device that oversamples the second digital data received from said second interface at a frequency n times said second sampling rate;

an adder that adds together the first digital data received from said first interface and the second digital data oversampled by said filter device; and a converter that converts digital data resulting from addition by said adder into an analog signal.

6. A digital data reproducing method comprising the steps of:

processing first digital data by a main body device;

receiving, by means of an interface, from an external device independent of said main body, second digital data having a sampling rate asynchronous with and different from a sampling rate of said first digital data, said first and second digital data being reproduced by said main body device;

oversampling said first digital data at a frequency n times said sampling rate of said first digital data;

adding together the first digital data oversampled by said oversampling step and the second digital data which are input via said interface; and converting digital data resulting from addition by said adding step into an analog signal.

7. A digital data transmitting method comprising the steps of:

transmitting, by means of a first interface, first digital data at a first sampling rate;

transmitting, by means of a second interface, second digital data at a second sampling rate which is asynchronous with and independent of said first sampling rate;

transmitting in an intermittent manner the first digital data which are received from said first interface, together with a first flag to said second interface using a main line; and transmitting an overflow of the first digital data occurring due to transmission of said first digital data by said main line alone, together with a second flag, to said second interface using an auxiliary line when said first sampling rate is greater than said second sampling rate.

8. A storage medium storing a program which can be executed by a computer, for realizing a digital data reproducing method, the method comprising the steps of:

processing first digital data by a main body device;

receiving, by means of an interface, from an external device independent of said main body, second digital data having a sampling rate asynchronous with and different from a sampling rate of said first digital data, said first and second digital data being reproduced by said main body device;

oversampling said first digital data at a frequency n times said sampling rate of said first digital data;

adding together the first digital data oversampled by said oversampling step and the second digital data which are input via said interface; and converting digital data resulting from addition by said adding step into an analog signal.

9. A storage medium storing a program which can be executed by a computer, for realizing a digital data transmitting method, the method comprising the steps of:

transmitting, by means of a first interface, first digital data at a first sampling rate;

transmitting, by means of a second interface, second digital data at a second sampling rate which is asynchronous with and independent of said first sampling rate;

transmitting in an intermittent manner the first digital data which are received from said first interface, together with a first flag to said second interface using a main line; and transmitting an overflow of the first digital data occurring due to transmission of said first digital data by said main line alone, together with a second flag, to said second interface using an auxiliary line when said first sampling rate is greater than said second sampling rate.

* * * * *